Aug. 2, 1966    H. BALDUS ETAL    3,263,916
FUNCTION CONTROL APPARATUS FOR CALCULATORS
Filed June 19, 1964    3 Sheets-Sheet 1

INVENTORS
Hugo Baldus
Berthold Hajen
BY: Michael J. Striker
ATTORNEY

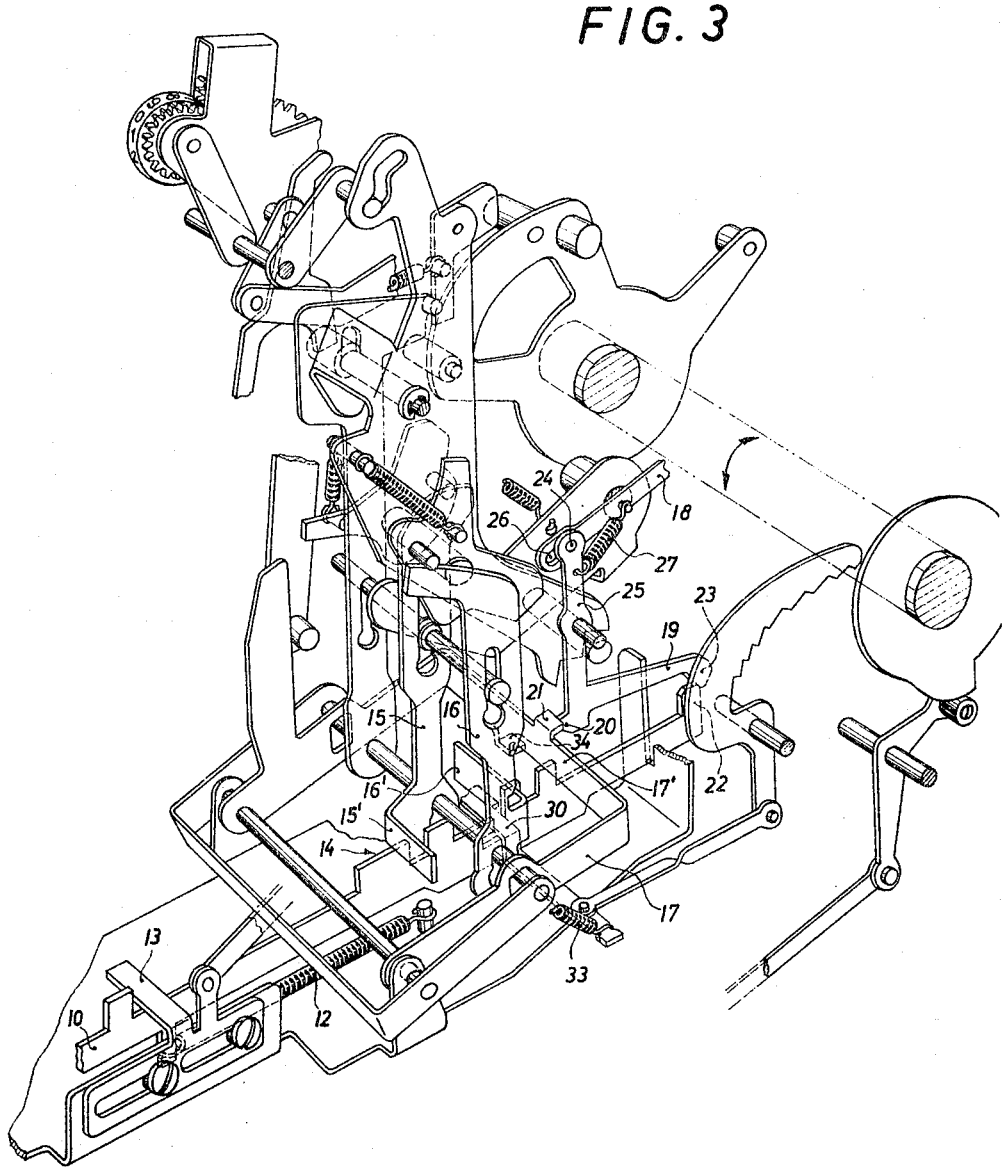

United States Patent Office 3,263,916
Patented August 2, 1966

3,263,916
FUNCTION CONTROL APPARATUS FOR CALCULATORS
Hugo Baldus, Wilhelmshaven, and Berthold Hajen, Sande, Germany, assignors to Olympia Werke AG, Wilhelmshaven, Germany
Filed June 19, 1964, Ser. No. 380,116
Claims priority, application Germany, June 20, 1963, O 9,486
9 Claims. (Cl. 235—60)

The present invention relates to a function control apparatus for calculators, accounting machines, and like business machines, and more particularly to a function control apparatus for setting a counting unit to perform different selected functions, such as the registering of positive or negative values, non-addition, taking of a subtotal, or taking of a total.

The apparatus of the invention is applied to a machine including a counting unit having number wheels turning in one direction of rotation when a positive value is introduced, and turning in the opposite direction of rotation when a negative value is introduced. The counting unit may be connected through the same register with a storage register, or be separated from both registers. Consequently, the counting unit has at least three positions for performing different functions, namely two positions coupled with the register for rotation in opposite directions, and a disengaged neutral position in which no values are transferred.

Apparatus of this type requires a control apparatus by which the function of the counting unit is determined in accordance with the selection of the operating person, so that the several coupled position between the registers and counting units take place in a predetermined timed relation.

Control apparatus serving this purpose is known by which the functions are preselected so that before the termination of a cyclic operation of the calculator or accounting machine, the function for the next following cycle can be selected and preset.

The known art provides a plurality of control slides associated with several functions of the counting unit, and a plurality of preselector slides which are resiliently connected with the control slides so that the preselector slides can be placed in a position corresponding to the function desired for the next following cycle of the machine, while the control slides would control the function during the prevailing cycle are still arrested.

In another construction of the prior art, function keys directly act on a common control member by which the several functions are set. However, this construction does not permit a preselection during a preceding cycle, and consequently operates at a comparatively low speed. Furthermore, a very complicated mechanism is required for controlling the functions of the counting unit in accordance with the positions of the control member.

It is one object of the invention to improve known calculators and accounting machines, and to provide a simple and efficient function control apparatus by which a calculator or accounting machine is controlled to perform different selected functions.

Another object of the invention is to provide a function control apparatus for a counting unit so that the same is selectively operable to perform additions, subtractions, non-addition, the taking of subtotals, and the taking of totals.

Another object of the invention is to provide a function control apparatus by which certain functions can be selected during a first cycle, and carried out during a following cycle of the machine.

Another object of the invention is to provide a function control apparatus in which the functions of the counting unit are determined by mechanical elements positively engaging each other.

Another object of the invention is to provide a function control apparatus in which all forces required for the operation are supplied by the motor of the machine and not by manual operations.

Another object of the invention is to provide function control apparatus permitting a very high speed of operation due to the small masses of the mechanical elements thereof, and being of such a simple construction that it can be economically manufactured at low cost.

With these objects in view, the present invention relates to a function control apparatus for calculators and accounting machines, and particularly controlling the functions of a counting unit. One embodiment of the invention comprises control means, preferably including a slide having projections and recesses of the same height, and being movable to a series of successive control positions respectively correlated with different functions of the counting unit; operating means, preferably including a cyclically operated drive member, for moving the control means to an inoperative position in which a spring is tensioned whereby the control means are urged by the spring to move successively toward the control positions; stop means, preferably including a stop member having a plurality of stepped stop portions respectively correlated with the functions of the counting unit, and being movable between a plurality of stop positions for blocking in each of the stop positions the movement of the control means in correlated control positions; function key means for selectively moving the stop means to one of the stop positions; and a plurality of function selecting means operable in a sensing movement toward and away from the control means and being stopped in different function selecting positions by the projections or recesses of the control member when the same is in said control positions. In accordance with the function selecting positions of the function selecting means, the counting unit is set to perform different selected functions.

In the preferred embodiment of the invention, the stop member is mounted for turning movement, and has a plurality of stepped stop portions. The stop member is turned by operation of several function keys, and a different stop portion is located in the path of movement of the control member when the same moves under the action of a spring from the inoperative position toward the control positions. The stop portions of the stop member are constructed to provide uniformly spaced stop faces which are engaged by a portion of the control member. Successive function keys effect turning of the stop member to successive positions in which successive stop faces are operative, while the control member can move over the preceding stop portion of the stop member. The function keys turn the stop member in one direction, and a spring urges the stop member to turn in the opposite direction so that forces can be positively transmitted only from the keys to the stop member. The control member, or the function keys, must be arrested until a point of the operation is reached after which no further cooperation of the control member with the function selecting means is necessary. Arresting means of this type are known, and not an object of this invention.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 3 is a plan view of the control apparatus.

Figure 1:
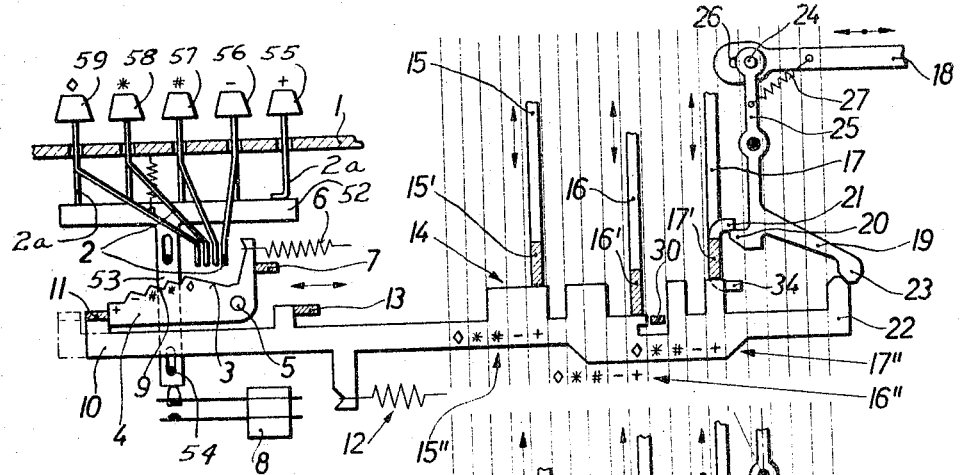
FIG. 1 is a fragmentary schematic side elevation, partially in section, illustrating the apparatus of the invention in an operational position correlated with a function commonly indicated by the symbol +.

Referring now to the drawings, and more particularly to FIG. 1, a plurality of function keys 55–59 is mounted outside of a casing well 1 and have stem portions 2 which are bent to have adjacent end portions, and other stem portions 2a whose ends are located in a common horizontal plane and cooperate with the cross bar 52 of a member 53 provided with slots by which member 53 is guided on pins 54 for vertical movement. When anyone of the function keys 55 to 59 is operated, member 52, 53 is shifted to close a switch 8 by which a motor driven cycle of the machine is started. Key 55 has no stem portion 2.

A stop member 4 is mounted on the frame of the machine for turning movement about an axis 5 and is urged by a spring 6 to abut a stop 7. An oblique face 3 is located opposite the stem portion 2 of function keys 56 to 59 so that depression of anyone of these function keys will cause turning movement of stop member 4 through a different angle about axis 5 against the action of spring 6. Stop member 4 has five stepped stop portions respectively correlated with function keys 55 to 59, as indicated by the symbols for plus, minus, non-addition, total, and subtotal.

A control member 10 in the form of an elongated slide is mounted on the machine frame, and urged by spring 12 to move to the right as viewed in the drawing until its stop portion 11 abuts stop member 4. A drive member 13 is cyclically operated in the direction of the arrow in FIG. 1 to move control member 10 to the inoperative position indicated in chain lines in FIG. 1 during the first part of the cycle, and to then release control member 10 for movement to the right under the action of spring 12 until stop portion 11 abuts stop member 4.

The apparatus is normally in the position "plus" shown in FIG. 1, so that the "plus" key 55 need not be provided with a stem 2. When key 56 is operated, it will engage the slanted surface 3 and turn stop member 4 to such an angle that the second "minus" stop portion is located in the path of movement of stop portion 11 of control member 10. By operation of keys 57, 58 and 59, the stop member is turned correspondingly through greater angles so that the stop portions 9 of stop member 4 are successively placed in the path of stop portion 11, so that control member 10, when released by the drive member 13 and moving under the action of spring 12, will move different distances to the right, depending on the stop position of stop member 4 selected by operation of one of the keys 56 to 59. When key 55 is operated, stop member 4 is not displaced, but its lowest stop portion is effective. However, actuation of key 55 will cause closing of switch 8 and start of a machine cycle.

Stop portion 11 is a bent over part of an upward projection of control member 10 so that stop portion 11 can pass, for example, over the lowest "plus" stop portion 9 of stop member 4 when the same has been turned by operation of the "minus" key 56 to a position in which the second stop portion 9 is located at the height of stop portion 11.

The right portion of control member 10 has three groups of projections and recesses 14 of the same height. Each group consists of five areas respectively correlated with the several functions, as indicated by symbols in FIG. 1. The first group cooperates with a function selecting means 15, the second group with a function selecting means 16, and a third group with a function selecting means 17.

The group of projections and recesses cooperating with function selecting means 15 has three projections of the same height forming a single projection, and two recesses of the same depth respectively associated with the total and the subtotal. The second group of projections and recesses overlaps in one area with the third group of projections and recesses, and has a recess extending over two areas associated with "plus" and "minus," two combined projections associated with non-addition and total, and one recess associated with the subtotal. The third group of projections and recesses has projections in the areas associated with "plus" and non-addition, and recesses associated with "minus" and with total and subtotal.

The function selecting means 15, 16 and 17 are reciprocable in the directions of the arrows, and perform a sensing movement toward control member 10 so as to be stopped in a higher position, as shown for means 15 and 17, when located opposite a projection, and to be stopped in a lower position, as shown for means 16, when located opposite a recess. In the position of FIG. 1, in which control member 10 is stopped by the stop portion 9 which is associated with the "plus" function of stop member 4, the areas 14 associated with the "plus" function are located, respectively, opposite horizontal projections 15', 16', and 17' of the function selecting means 15, 16 and 17.

At the beginning of a machine cycle, function selecting means 15, 16 and 17 are raised so that control member 10, released by drive member 13, can be moved by spring 12 to the control position determined by the position of stop member 4 without interferring with the projections 15', 16' and 17'. When control member 10 is in one of the control positions, for example in the "plus" position shown in FIG. 1, the function selecting means 15, 16, and 17 are released and move in a downward sensing movement toward control member 10 until stopped by a projection or recess.

Function selecting means 15, 16, and 17 control the function of a counting unit. Function selecting means 15 is correlated with the output of the counting unit, and will permit transfer of a value in the lower position thereof, and prevent the transfer of a value by disconnecting the counting unit from another register. Function selecting means 16 is correlated with the input of the counting unit, and will permit the entry of a value into the counting unit in its lower position by coupling the counting unit to an input register. The counting unit will be separated from the input register in the upper position of function selecting means 16.

The function selecting means 17 has an upper position in which the counting unit is controlled to rotate in a positive direction of rotation, and a lower position in which the counting unit is controlled to rotate in the opposite negative direction of rotation.

The apparatus of the invention is applied to an accounting machine of the type in which the direction of rotation of the counting unit during the taking of a subtotal or total depends on whether the counting unit contains a positive or negative balance.

Figure 1A:
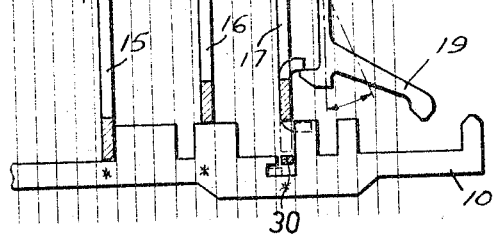
FIG. 1a is a fragmentary schematic elevation, partially in section, illustrating the apparatus in another operational position correlated with a function commonly indicated by the symbol *.

A member 18 is controlled in a known manner from the counting unit to move between two positions respectively associated with the positive or negative value stored in the counting unit. The adjusting member 18 has an elongated slot 26 into which a pin 24 of a lever element 19 projects so that lever element 19 is connected with adjusting member 18 by a lost motion connection. A spring 27 connects lever element 19 with adjusting member 18 and urges lever element 19 to a position in which pin 24 is located at one end of slot 26. Function selecting means 17 has two transverse projections 21 and 34 of which projection 21 cooperates with a projection 20 on lever element 19, while another arm of lever element 19 has a projection 23 cooperating with a projection 22 at the end of control member 10. When projection 20 engages projection 21, function selecting means 17 cannot move into a recess of control member 10, even if located opposite a recess, as shown in FIG. 1a. When control member 10 is moved to the position shown in FIG. 1c in which projection 22 engages projection 23, lever element 19 is turned relative to adjusting member 18, with pin 24 moving in slot 26 to the other end thereof, and projection 20 is moved out of the path of movement of projection 21 of function selecting means 17 so that the same can move into a recess of control member 10.

Figure 1B:
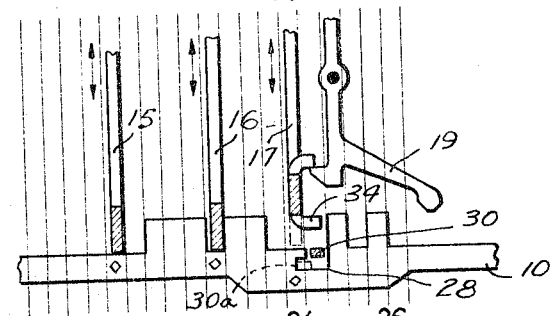
FIG. 1b is a fragmentary schematic elevation, partially in section, illustrating the apparatus in another operational position commonly indicated by the symbol ◇.

It will be understood that function adjusting means 18, 19, 20 can overrule the selection made by shifting control member 10. This is necessary in the position of the apparatus associated with total taking, as shown in FIG. 1a, and with the position of the apparatus associated with subtotal taking, as illustrated in FIG. 1b. In these positions, recesses of control member 10 are located opposite function selecting means 17. In the positions of FIGS. 1a and 1b, the direction of rotation of the counting unit is determined only by the function adjusting means 18, 19, 20. In the positions of the apparatus causing rotation of the counter unit in positive or negative directions, respectively, during addition represented by "plus" and during subtraction represented by "minus," the function adjusting means 18, 19, 20 should not be effective to influence the operations. In the "non-addition" position of the apparatus, the counting unit remains in the neutral position disengaged from the other registers, and consequently the position of the function adjusting means is immaterial.

In the particular construction illustrated in the drawing, the function adjusting means 18, 19, 20 is in an operative position during a "plus" operation, as shown in FIG. 1, which is immaterial since the corresponding projection on control member 10 holds function selecting means 17 in the same position in which it is held by projection 20.

Figure 1C:
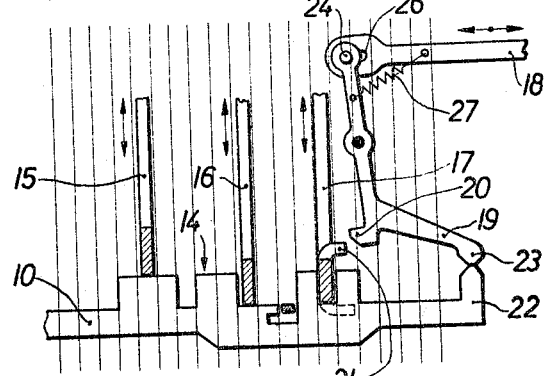
FIG. 1c is a fragmentary schematic elevation, partially in section, illustrating another operational position of the apparatus commonly indicated by the symbol —.

During a "minus" operation, function adjusting means 18, 19, 20 must be rendered inoperative which is effected by projection 22 of control member 10 when the same is in the "minus" control position as shown in FIG. 1c.

Even if the counting unit causes shifting of adjusting member 18 to a position in which projection 20 would be operative to stop function selecting means 17 in its higher position, projection 22 of control member 10 nevertheless turns adjusting lever element 19 with projection 20 to an inoperative position which is possible due to the lost-motion connection between pin 24 and slot 26, as shown in FIG. 1c. Spring 27 holds lever element 19 normally in the position of FIG. 1 so that the force of spring 12 moving control member 10 to the position of FIG. 1c must exceed the force of spring 27.

FIG. 1 illustrates the apparatus in a position in which the counting unit is to be turned in the positive direction of rotation in an additive function, as represented by the "plus" symbols. Consequently, stop member 4 is in a position in which the "plus" stop portion is engaged by stop projection 11, function selecting means 15 is located opposite the "plus" area of the group of projections and recesses indicated by the symbols 15″, function selecting means 16 is located opposite the recessed "plus" area of the group of projections and recesses indicated by the symbols 16″, and function selecting means 17 is located opposite a projecting "plus" area of the group of projections and recesses indicated 17″.

Since function selecting means 15 is stopped in its upper position by the respective projection of the control member 10, the output of the counting unit is disconnected so that no transfer to another register can take place. Since function selecting means 16 is permitted to move to its lower position by a recessed portion of control member 10, the input of the counting unit is coupled to an input means so that a value can be entered into the counting unit. Function selecting means 17 is stopped by a projecting portion of the control member 10 in its upper position, and is also stopped by projection 20 of the function adjusting means 18, 19, 20 in the same position which means that the counting unit will rotate in a positive direction to add the introduced value. However, the position of the function adjusting means is immaterial during this operation, since function selecting means 17 could not move farther down even if its projection 21 were released by projection 20.

The position shown in FIG. 1a represents the apparatus during a total taking operation. Stop member 4 and the function keys are not shown in FIG. 1a, and it will be understood that the total key 58 was operated to turn stop member 4 such an angle that the stop portion 9 indicated by the symbol for taking of a total, is located opposite stop projection 11 of control member 10. Key 58 was operated while control member 10 was moved to the inoperative position indicated in chain lines in FIG. 1 by the drive member 13, and when drive member 13 permits control member 10 to move under the action of spring 12, stop projection 11 abuts the stop face of the stop portion 9 located in its path of movement, so that control member 10 moves farther to the right, as shown in FIG. 1a to a position in which function selecting means 15, 16, and 17 are respectively located opposite areas of control member 10 which are associated with total taking. This means that function selecting means 15 is located opposite a recess, function selecting means 16 is located opposite a projection, and function selecting means 17 is located opposite a recess. The positions of function elements 15 and 16 are determined, and function selecting means 15 in its lower position will couple the output of the counting unit, while function selecting means 16 in its higher position will disengage the input coupling.

In the event that the counting unit has a negative balance it would be necessary to rotate the counting unit in the negative direction of rotation, and this would be accomplished by permitting function selecting means 17 to move into the recess of control member 10 which is located opposite function selecting means 17 in the position of FIG. 1a. If the counting unit had such a negative balance, adjusting member 18 would have moved to the left as viewed in FIG. 1, and would have turned adjusting lever element 19 in counterclockwise direction into the position indicated by a chain line in FIG. 1a, so that projection 20 would not be located in the path of movement of projection 21, permitting function selecting means 17 to move into the opposite recess. However, in the position of FIG. 1a, it is assumed that the counting unit has a positive balance, in which event adjusting member 18 is in the position shown in FIG. 1, and adjusting lever element 19, 20 is in the position illustrated in FIG. 1a so that its projection 20 stops function selecting means 17 in its higher position whereby the counting unit rotates in the positive direction of rotation.

The position of the apparatus illustrated in FIG. 1b is associated with the taking of a subtotal. When the subtotal key 59 is operated, its stem 2 turns stop member 4 through the greatest possible angle since the respective stem is located farthest spaced from the axis 5. The uppermost stop portion of stop member 4 is located in the path of movement of stop projection 11 of control member 10, and consequently when the same moves to the right under the action of spring 12, stop projection 11 passes over all other stop portions 9 of stop member 4 and is blocked in a position in which it has moved the greatest possible distance to the right. In this position, the areas of control member 10 associated with the subtotal are located opposite function selecting means 15, 16 and 17, and more particularly, function selecting means 15, 16 and 17 are located opposite recesses of control member 10. Consequently, function selecting means 15 and 16 will be stopped in the lower positions thereof so that the counting unit is successively coupled with a register to receive an input value and with a register to transfer the value as an output value. These operations take place during different time periods of the machine cycle. For example, in the event that the calculator has an oscillating main shaft, the coupling for the output of the value can be operated during the forward stroke, and the counting unit is coupled again during the return stroke. The transfer of values into and out of the counting unit may be accomplished by bringing ordinal sets of gears into meshing engagement during the transfer, and separating the gears when no transfer is desired. This arrangement is not an object of the present invention, and corresponding structure and operations are disclosed, for example, in the U.S. Patent 2,665,844, issued to K. Westinger et al. on January 12, 1954. The present invention is concerned only with the construction and operation of a function control apparatus by which function selecting means 15, 16, 17, which are known and perform known operations, are controlled.

In the position of FIG. 1b, function selecting means 17 would move to its lower position since it is located opposite a recess of control member 10, but is blocked by the function adjusting means 18, 19, 20 since the same are in a position corresponding to a positive balance. A positive balance requires rotation of the counting unit in the positive direction of rotation, and therefore movement of function selecting means 17 to the lower position in which it causes rotation of the counting unit in the negative direction of rotation must be prevented by the function adjusting means 18, 19, 20. If a negative balance were stored in the counting unit, adjusting member 18 would be in such a position that projection 20 would release projection 21 of function selecting means 17 so that the same could move to the lower position.

FIG. 1c illustrates the position of the apparatus in which the counting unit is turned in the negative direction of rotation. The projections and recesses 14 are so designed that function selecting means 15 and 16 assume the same position as in FIG. 1 so that the output of the storing unit is de-coupled, while the input is coupled. As explained above, the lower position of function selecting means 17 results in rotation of the counting unit in the negative direction of rotation and due to the fact that function selecting means 17 moves into a recess of control member 10, it assumes this position.

During the "minus" operation, the counting unit must rotate in the negative direction of rotation, irrespective of the positive or negative character of the balance stored therein. Therefore, function adjusting means 18, 19, 20 are prevented from blocking function selecting means 17.

Assuming that a negative balance is stored, function adjusting member 18 will move to the left out of the position shown in FIG. 1, and turn lever element 19, 20 in counterclockwise direction to the position illustrated by chain lines in FIG. 1a, so that projection 20 is located out of the path of movement of projection 21.

In the event that a positive balance is stored, adjusting member 18 is in the position shown in FIG. 1 and FIG. 1c so that spring 27 urges lever element 19, 20 to the position shown in FIG. 1. However, in the position which control member 10 assumes when key 56 is operated, projection 22 is in such a position as to engage end portion 23 of lever element 19, 20, and to turn the same against the action of spring 27 in counterclockwise direction to the position illustrated in FIG. 1c so that projection 20 is located out of the way of projection 21 of function selecting means 17, and cannot block the same. Such relative movement between lever element 19, 20 and adjusting member 18, is possible due to the lost-motion connection between members 18 and 19, since pin 24 can move to the left end of slot 26, as shown in FIG. 1c. In this manner, the required rotation of the counting unit in the negative direction of rotation is accomplished irrespective of whether a positive or a negative balance is stored.

The position of the apparatus for "non-addition" is not illustrated. When key 57 is operated, stop member 4 is turned such an angle that the respective stop portion 9 is located in the path of movement of stop projection 11 of control member 10, which moves a corresponding distance to the right. Function selecting means 15, 16, and 17 will be located opposite projections, as is apparent from the symbols 15", 16" and 17" in FIG. 1. Consequently, input and output connections of the counting unit are disengaged. The position of function selecting means 17 is immaterial since the disengaged counting unit is not driven. For the same reason, the position of the function adjusting means 18, 19, 20 is immaterial.

Figure 2:
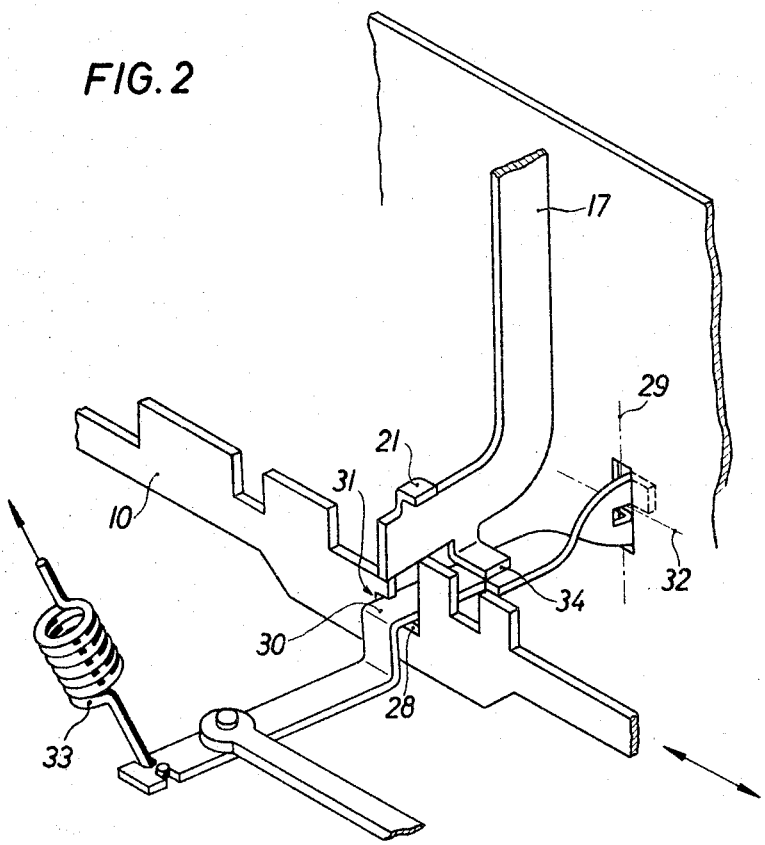
FIG. 2 is a fragmentary perspective view illustrating a detail of the apparatus on an enlarged scale.

An accounting machine of the type with which the present invention is concerned, requires the printing of a symbol representing the respective function. A printing control lever 30 is located in a stepped cutout 28 of control member 10, as best seen in FIG. 2. When control member 10 is shifted between the above explained control position, printing control lever turns about a vertical axis 29 between a plurality of angular positions corresponding to the control positions of control member 10 and sets the printing means to a position for printing the respective symbol. When a subtotal or a total has to be identified by the printed symbol, it is also necessary to add a "plus" or "minus" symbol.

In accordance with the present invention, the printing control lever 30 is not only turnable about the vertical axis 29, but is also turnable about the horizontal axis 32 between a higher position located in the narrow upper part of cutout 28 and a lower position located in the lower wider part of cutout 28. Since printing control lever 30 is also turnable about the vertical axis 29, as explained above, it can turn in the lower portion of cutout 28 between two positions. A spring 33 extends at an angle to the vertical direction, and urges printing control lever 30 in upward direction into the narrow part of slot 28, but also to the left as viewed in FIG. 2, so that printing control lever will move to the left in the wider lower portion of cutout 28 when it is moved down into the lower portion of the cutout against the action of spring 33.

Function selecting means 17 has a transverse projection 34 located directly above printing control lever 30. Projection 34 has a width corresponding to the width of two areas of control member 10. Since projection 34 is located behind control member 10, it has no effect in the position of FIGS. 1 and 1c. However, in the positions of FIGS. 1a and 1b, projection 34 is located above printing control lever 30.

If function selecting means 17 is retained by function adjusting means 18, 19, 20 in the upper position, spring 33 holds printing control member in its normal upper position located in the upper part of cutout 28, as in the other control positions of the apparatus. The printing means are so constructed that in this position of printing control member 30, not only the "total" symbol in the position of FIG. 1a, and the "subtotal" symbol in the position of FIG. 1b is printed, but that a "plus" sign is printed at the same time.

However, when function adjusting means 18, 19, 20 is operated in accordance with a negative balance and permits function selecting means 17 to move in downward direction to its lower position, projection 34 engages printing control lever 30 in either of the positions of FIGS. 1a and 1b, and presses printing control lever 30 down to its lower position located in the lower wider portion of cutout 28. Due to the fact that spring 33 exerts a pull to the left as viewed in the drawing, printing control lever 30 is shifted to the left and located as shown at 30a in FIGS. 1a and 1b in which it is prevented from upward movement, and in this lower position of printing control lever 30, the printing means are designed to print the respective symbol for "total" or "subtotal" with a "minus" symbol.

From the above description it will become apparent that the present invention provides a very simple control apparatus for controlling the function of a counting unit or register. All functions are controlled by a single control member which is positively stopped in the several control positions by a single stop member placed in a selected stop position by positive engagement with a function key. The operator does not have to overcome the force of springs, as in the prior art, and all necessary forces are provided from the drive of the machine which moves control member 10 against the action of spring 12 so that the further movements of the control member are caused by the tensioned spring 12.

It will be understood that each of the elements described above, or two or more together, may also find a useful application in other types of function control arrangements differing from the types described above.

While the invention has been illustrated and described as embodied in a function control arrangement including a single manually set stop member and a single control member controlling function elements for setting a calculator to perform different functions, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Function control apparatus for calculators and accounting machines, comprising, in combination, control means movable between an inoperative position and a series of successive control positions respectively correlated with different functions of a counting unit; operating means for moving said control means first to said inoperative position and then toward successive control positions; a stop member having a plurality of stop portions and being movable in said inoperative position of said control means between a plurality of stop positions respectively correlated with said functions, said stop portions being respectively located in the path of movement of said control means from said inoperative position to said control positions, and blocking in each of said stop positions movement of said control means in the control position correlated with the same function; a plurality of function keys for selectively moving said stop member to different stop positions; and a plurality of function selecting means operable in a sensing movement toward said control means and being stopped in different function selecting positions by said control means in said control positions, respectively, said function selecting means in said function selecting positions being adapted to set a counting unit to perform selected functions.

2. Function control apparatus for calculators and accounting machines, comprising, in combination, control means movable between an inoperative position and a series of successive control positions respectively correlated with different functions of a counting unit; operating means including a cyclically operating drive member for moving said control means to said inoperative position, and spring means for urging said control means to move successively toward said control positions; stop means including a stop member having a plurality of stepped stop portions, said stop member being turnable in said inoperative position of said control means between a plurality of stop positions respectively correlated with said functions, said stop portions being respectively located in the path of movement of said control means from said inoperative position to said control positions, and blocking in each of said stop positions movement of said control means in the control position correlated with the same function; a plurality of function keys, spaced different distances from said stop member, each function key being movable the same distance to an actuated position engaging said stop member for turning said stop member through different angles to one of said stop positions; and a plurality of function selecting means operable in a sensing movement toward said control means and being stopped in different function selecting positions by said control means in said control positions, respectively, said function selecting means in said function selecting positions being adapted to set a counting unit to perform selected functions.

3. Function control apparatus for calculators and accounting machines, comprising, in combination, a control means having a plurality of groups of projections and recesses, and being movable between an inoperative position and a series of successive control positions respectively correlated with different functions of a counting unit; operating means including a cyclically operating drive member for moving said control means to said inoperative position, and spring means for urging said control means to move successively toward said control positions; stop means including a stop member having a plurality of stepped stop portions, said stop member being turnable in said inoperative position of said control means between a plurality of stop positions respectively correlated with said functions, said stop portions being respectively located in the path of movement of said control means from said inoperative position to said control positions, and blocking in each of said stop positions movement of said control means in the control position correlated with the same function; means for selectively moving said stop means to one of said stop positions; and a plurality of reciprocable function selecting means moving in one direction of reciprocation in a sensing movement toward said control means, each function selecting means being located relative to said control means so as to cooperate with one of said groups of projections and recesses, said function selecting means being stopped in different function selecting positions by different projections and recesses of said groups in said control positions of said control means, said function selecting means in said function selecting positions being adapted to set a counting unit to perform selected functions.

4. Function control apparatus for calculators and accounting machines, comprising, in combination, control means including a single control member having a plurality of groups of projections and recesses of the same height and being movable between an inoperative position and a series of successive control positions respectively correlated with different functions of a counting unit; operating means including a cyclically operating drive member for moving said control means to said inoperative position, and spring means for urging said control means to move successively toward said control positions; stop means including a stop member having a plurality of stepped stop portions, said stop member being turnable in said inoperative position of said control means between a plurality of stop positions respectively correlated with said functions, said stop portions being respectively located in the path of movement of said control means from said inoperative position to said control positions, and blocking in each of said stop positions movement of said control means in the control position correlated with the same function; a plurality of function keys, spaced different distances from said stop member, each function key being movable the same distance to an actuated position engaging said stop member for turning said stop member through different angles to one of said stop positions; and a plurality of function selecting means operable in a sensing movement toward said control means, one of said function selecting means being correlated with the input of a counting unit, another of said function selecting means being correlated with the output of the counting unit, and still another function selecting means being correlated with the direction of rotation of said counting unit, each function selecting means being located relative to said stop means so as to cooperate with one of said groups of projections and recesses and being stopped in one or the other of two function selecting positions by said projections and recesses, respectively, of the respective group, said function selecting means being stopped in different combinations of said two respective function selecting positions by different projections and recesses of said groups in said control positions of said control means whereby the counting unit is set by said function selecting means to perform selected functions.

5. Function control apparatus for calculators and accounting machines, comprising, in combination, control means including a single control member having a plurality of groups of projections and recesses of the same height and being movable between an inoperative position and a series of successive control positions respectively correlated with different functions of a counting unit; operating means including a cyclically operating drive member for moving said control means to said inoperative position, and spring means for urging said control means to move successively toward said control positions; stop means movable between a plurality of stop positions respectively correlated with said functions, and blocking in each of said stop positions movement of said control means in the control position correlated with the same function; means for selectively moving said stop means to one of said stop positions; a plurality of function selecting means operable in a sensing movement toward said control means, each function selecting means being located relative to said control means so as to cooperate with one of said groups of projections and recesses and being stopped in one or the other of two function selecting positions by said projections and recesses, respectively, of the respective group, one of said function selecting means being correlated with the direction of rotation of said counting unit and adapted to cause rotation of the same in one direction when engaging a projection, and rotation in the opposite direction when engaging a recess of said control means, the other function selecting means in said function selecting positions being adapted to set the counting unit to perform selected functions; and a function adjusting means adapted to be operated from the counting unit in accordance with a positive or negative balance for blocking movement of said one function selecting means in said one function selecting position when a recess of said control means is located opposite said one function control means if rotation of the counting unit in said one direction is required.

6. Function control apparatus for calculators and accounting machines, comprising, in combination, a control means including a single control member having a plurality of groups of projections and recesses of the same height and being movable between an inoperative position and a series of successive control positions respectively correlated with different functions of a counting unit; operating means for moving said control means first to said inoperative position and then toward successive control positions; stop means including a stop member having a plurality of stepped stop portions, said stop member being turnable in said inoperative position of said control means between a plurality of stop positions respectively correlated with said functions, said stop portions being respectively located in the path of movement of said control member from said inoperative position to said control positions, and blocking in each of said stop positions movement of said control means in the control position correlated with the same function; a plurality of function keys, spaced different distances from said stop member, each function key being movable the same distance to an actuated position engaging said stop member for turning said stop member through different angles to one of said stop positions; a plurality of function selecting means operable in a sensing movement toward said control means, each function selecting means being located relative to said control means so as to cooperate with one of said groups of projections and recesses and being stopped in one or the other of two function selecting positions by said projections and recesses, respectively, of the respective group, one of said function selecting means being correlated with the direction of rotation of said counting unit and adapted to cause rotation of the same in one direction when engaging a projection, and rotation in the opposite direction when engaging a recess of said control means, the other function selecting means in said function selecting positions being adapted to set the counting unit to perform selected functions; and a function adjusting means adapted to be operated from the counting unit in accordance with a positive or negative balance for blocking movement of said one function selecting means in said one function selecting position when a recess of said control means is located opposite said one function control means if rotation of the counting unit in said one direction is required, said function adjusting means including an adjusting member operated by said counting unit, an element operable by said adjusting member to block said one function selecting means, and lost-motion means connecting said adjusting member with said element for relative movement, said control means engaging said element in at least one selector control position for moving the same relative to said adjusting member and said one function selecting means to a releasing position in which said one function selecting means is free to move into a correlated recess of said control means so as to assume the other function selecting position thereof.

7. Function control apparatus for calculators and accounting machines, comprising, in combination, control means including a single control member having a plurality of groups of projections and recesses of the same height and being movable between an inoperative position and a series of successive control positions respectively correlated with different functions of a counting unit; operating means including a cyclically operating drive member for moving said control means to said inoperative position, and spring means for urging said control means to move successively toward said control positions; stop means including a stop member having a plurality of stepped stop portions, said stop member being turnable in said inoperative position of said control means between a plurality of stop positions respectively correlated with said functions, said stop portions being respectively located in the path of movement of said control means from said inoperative position to said control positions, and blocking in each of said stop positions movement of said control means in the control position correlated with the same function; a plurality of function keys, spaced different distances from said stop member, each function key being movable the same distance to an actuated position engaging said stop member for turning said stop member through different angles to one of said stop positions; and a plurality of reciprocable function selecting means moving in one direction of reciprocation in a sensing movement toward said control means, each function selecting means being located relative to said control means so as to cooperate with one of said groups of projections and recesses, said function selecting means being stopped in different function selecting positions by different projections and recesses of said groups in said control positions of said control means, said function selecting means in said function selecting positions being adapted to set a counting unit to perform selected functions.

8. A function control apparatus as set forth in claim 7 wherein said control means has a cutout having a narrow first portion, and a second portion wider than said first portion in the direction of movement of said control means; a printing control member located in said cutout; spring means connected to said printing control member for urging the same to a normal position located in said first portion of said cutout so that said printing control member moves with said control means between a plurality of positions for causing printing of symbols associated with said functions, and wherein one of said function selecting means is located in the region of said cutout in at least one selected control position of said control means so as to engage said printing control member at the end of said sensing movement to move the same into said second portion of said cutout, said spring means also urging said printing control member opposite to the direction of movement of said control means to one end of said second wider portion, said printing control member being adapted to cause printing of the same symbol with plus or minus signs, respectively, when located in said first portion or second portion of said cutout.

9. A function control apparatus as set forth in claim 8 wherein said printing control member is a lever mounted for turning movement about two axes extending at right angles to each other, one of said axes being parallel to the direction of movement of said control means and the other axis being parallel to the direction of movement of said one function selecting means; and wherein said spring means extends at an angle to said two axes.

References Cited by the Examiner

UNITED STATES PATENTS

| | | | |
|---|---|---|---|
| 2,186,265 | 1/1940 | Norton | 235—60.18 |
| 2,256,693 | 9/1941 | Thomas | 235—60.52 |
| 2,280,919 | 4/1942 | Landsiedel | 235—60.18 |
| 2,284,803 | 6/1942 | Crosman | 235—60.5 |
| 2,665,844 | 1/1954 | Westinger | 235—60.2 |
| 2,705,106 | 3/1955 | Westinger | 235—60.2 |
| 2,861,746 | 11/1958 | Anderson | 235—145 X |
| 2,969,176 | 1/1961 | Anderson | 235—60.18 |
| 3,061,187 | 10/1962 | Bacher | 235—60.5 |
| 3,104,807 | 9/1963 | Plaut | 235—60 |

LOUIS J. CAPOZI, *Primary Examiner.*

LEO SMILLOW, *Examiner.*

T. J. ANDERSON, *Assistant Examiner.*